(12) United States Patent
Elkins, II et al.

(10) Patent No.: US 8,622,627 B2
(45) Date of Patent: Jan. 7, 2014

(54) ADAPTER PLATE FOR SECURING AN ADAPTER TO A SURFACE

(75) Inventors: Robert Bruce Elkins, II, Hickory, NC (US); Barton Pierce Filipiak, Fuquay Varina, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/448,669

(22) Filed: Apr. 17, 2012

(65) Prior Publication Data

US 2012/0252244 A1 Oct. 4, 2012

Related U.S. Application Data

(63) Continuation of application No. PCT/US2010/049416, filed on Sep. 20, 2010.

(60) Provisional application No. 61/253,660, filed on Oct. 21, 2009.

(51) Int. Cl.
*G02B 6/38* (2006.01)

(52) U.S. Cl.
USPC .......................................................... 385/73

(58) Field of Classification Search
USPC ............ 385/78, 73–75, 55–68, 135; 439/551, 439/564, 565
See application file for complete search history.

(56) References Cited

U.S. PATENT DOCUMENTS

| 5,274,729 | A | 12/1993 | King et al. ..................... 385/134 |
| 6,464,406 | B1 | 10/2002 | Yarita et al. ..................... 385/60 |
| 6,467,971 | B1 * | 10/2002 | Carberry et al. ................ 385/58 |
| 6,648,520 | B2 | 11/2003 | McDonald et al. ............. 385/78 |
| 7,665,901 | B2 * | 2/2010 | Kewitsch ......................... 385/73 |
| 2005/0185895 | A1 | 8/2005 | Keenum et al. ................. 385/76 |

OTHER PUBLICATIONS

PCT Search Report, Mar. 24, 2011, 2 pages.

* cited by examiner

*Primary Examiner* — Phuong Dinh

(57) ABSTRACT

An adapter plate assembly includes an adapter for mating two connectors and an adapter plate. The adapter includes a first end and a second end and a passage therethrough. The adapter further includes an adapter footprint and an adapter flange. The first end has an external threaded portion and the second end has an external threaded portion. The adapter is adapted to receive a ruggedized connector in the first and a multi-fiber connector in the second end. The adapter plate includes an aperture for receiving at least a portion of the adapter, a footprint receiving portion for receiving at least a portion of the adapter footprint, a flange receiving portion for receiving the adapter flange, and an attachment feature. A method of assembling the adapter plate and mounting the adapter plate to a non-standard wall is described.

9 Claims, 4 Drawing Sheets

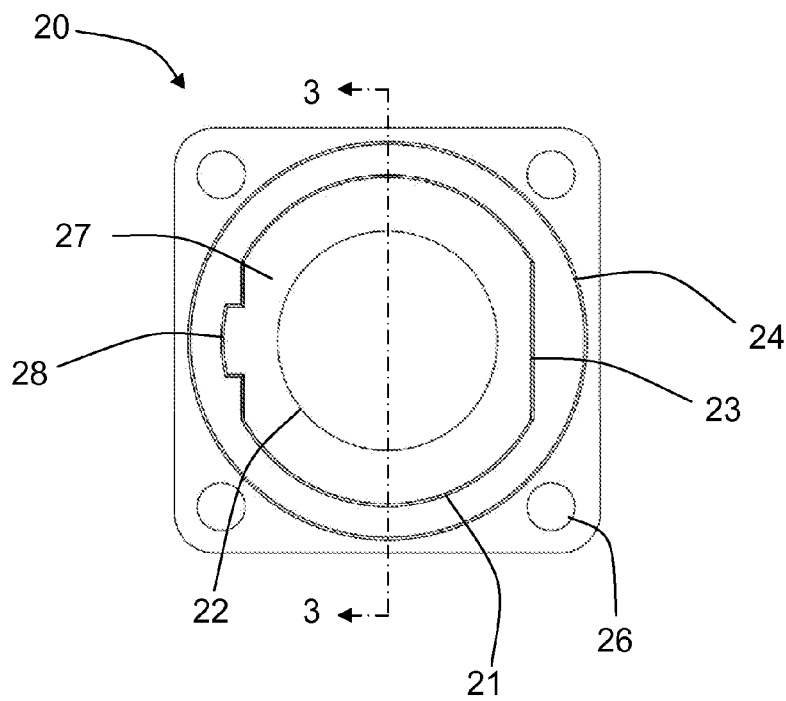
FIG. 2
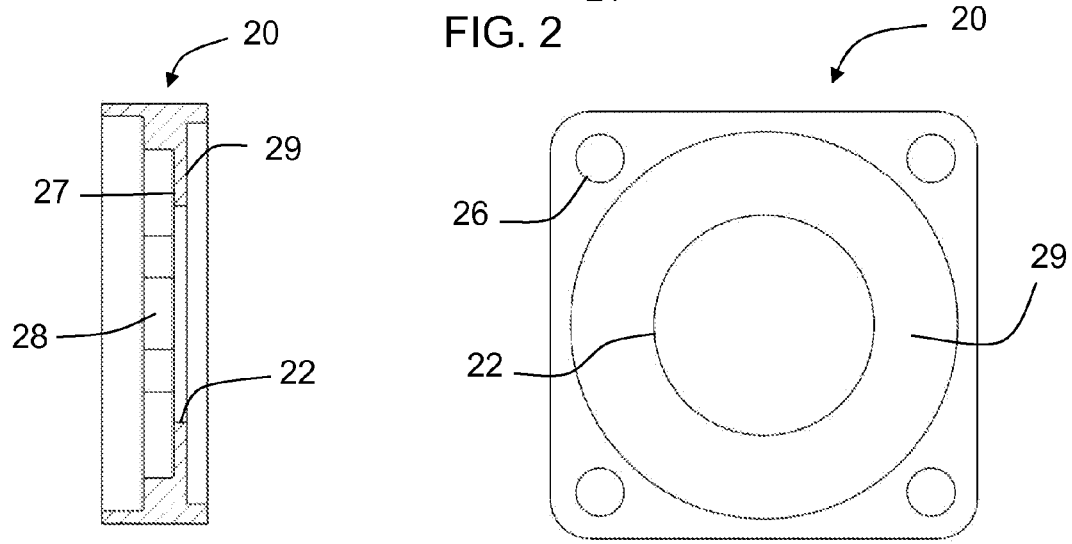
FIG. 3
FIG. 4

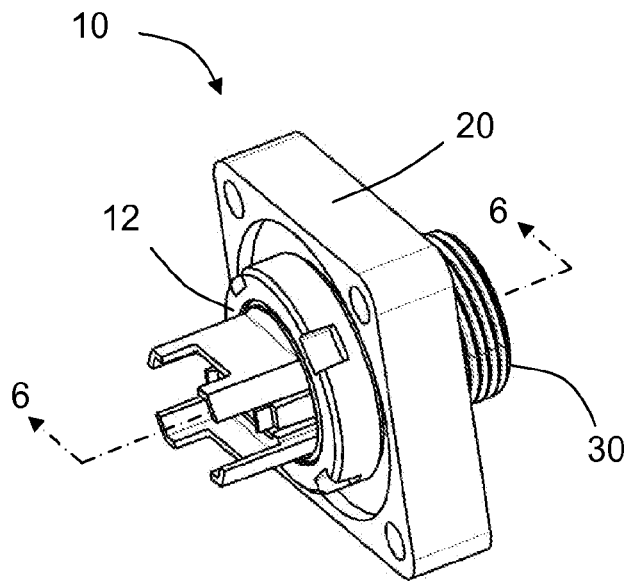
FIG. 5
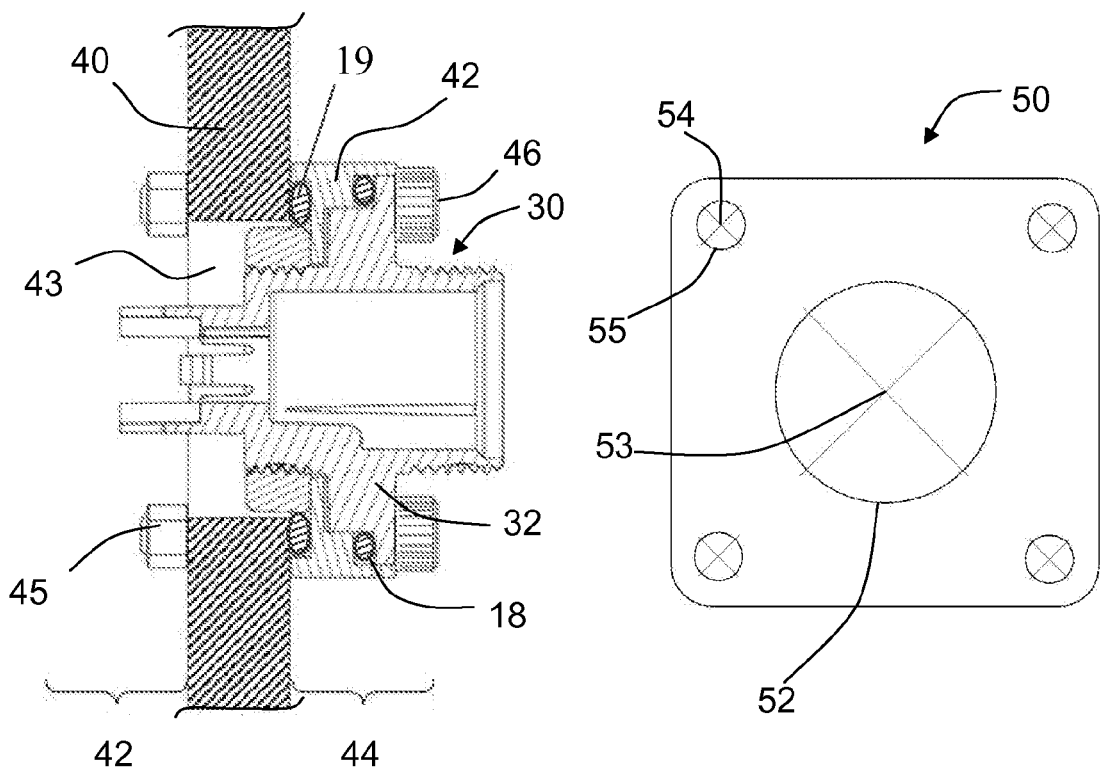
FIG. 6
FIG. 7

ADAPTER PLATE FOR SECURING AN ADAPTER TO A SURFACE

RELATED APPLICATIONS

This application is a continuation of International Application No. PCT/US10/49416 filed Sep. 20, 2010, which claims the benefit of priority to U.S. application Ser. No. 61/253,660, filed Oct. 21, 2009, both applications being incorporated herein by reference.

BACKGROUND

1. Field of the Disclosure

An adapter plate is disclosed and methods therefor. In particular, an adapter plate is disclosed which secures and seals an adapter to an equipment housing wall and methods therefor.

2. Technical Field

It is often necessary within fiber optic networks to optically connect optical fibers through mating connectors. Mating connectors may include connector alignment features on the ferrules for fine alignment, but are typically grossly aligned using some form of adapter assembly. Adapters may be stand-alone components or may be maintained within network structures, walls or receptacles, for example, within a network connection terminal or on an antenna mounted electronics housing. Desirable adapters should not only properly align mating connectors, but should also protect the mating connectors and optical fibers from adverse environmental and mechanical influences, such as from side loading, rotational and tensile forces.

In many cases, the network structures, walls or receptacles are not configured to receive such a desirable adapter. Upgrades, retrofitting, and alterations to existing networks may require the application of a new or different adapter. Most adapters have particular installation geometrical constraints or "footprint," usually defined by the network structures, walls or receptacles. However, in some cases such footprints are not available to the craft. An adapter plate is therefore needed to retrofit the particular footprints of a desired adapter to the network structures, walls or receptacles.

SUMMARY

The disclosure describes an adapter plate assembly including an adapter for mating two connectors and an adapter plate. The adapter includes a first end and a second end and a passage therethrough. The adapter further includes an adapter footprint and an adapter flange. The first end has an external threaded portion and the second end has an external threaded portion. The adapter is adapted to receive a ruggedized connector in the first end and an MT connector in the second end. The adapter plate includes an aperture for receiving at least a portion of the adapter, a footprint receiving portion for receiving at least a portion of the adapter footprint, a flange receiving portion for receiving the adapter flange, and an attachment feature.

The disclosure also set outs a method of mounting a standard adapter to a non-standard wall by providing a standard adapter and an adapter plate, the adapter plate having a footprint configured to receive the standard adapter. The method involves placing a drill template on the non-standard wall and drilling holes in the non-standard wall to accommodate the standard adapter and the adapter plate, and securing the adapter to the adapter plate, and securing the adapter plate to the non-standard wall.

Additional features are set out in the detailed description which follows, and in part will be readily apparent to those skilled in the art from that description or recognized by practicing the described embodiments and the claims, as well as the appended drawings.

It is to be understood that both the general description and the detailed description are exemplary, and are intended to provide an overview or framework to understand the claims. The accompanying drawings are included to provide a further understanding, and are incorporated in and constitute a part of this specification. The drawings illustrate one or more embodiment(s), and together with the description serve to explain principles and operation of the embodiments.

BRIEF DESCRIPTION OF THE DRAWINGS

FIG. 2 is a front view of an adapter plate;

FIG. 3 is a cross sectional side view of the adapter plate of FIG. 2;

FIG. 4 is a bottom view of the adapter plate of FIG. 2;

FIG. 5 is an assembled perspective view of the adapter plate assembly of FIG. 1;

FIG. 6 is a cross sectional side view of the adapter assembly of FIG. 1 mounted on a wall;

FIG. 7 is a drill template for the adapter plate of FIGS. 2-4; and

DETAILED DESCRIPTION

Figure 1:
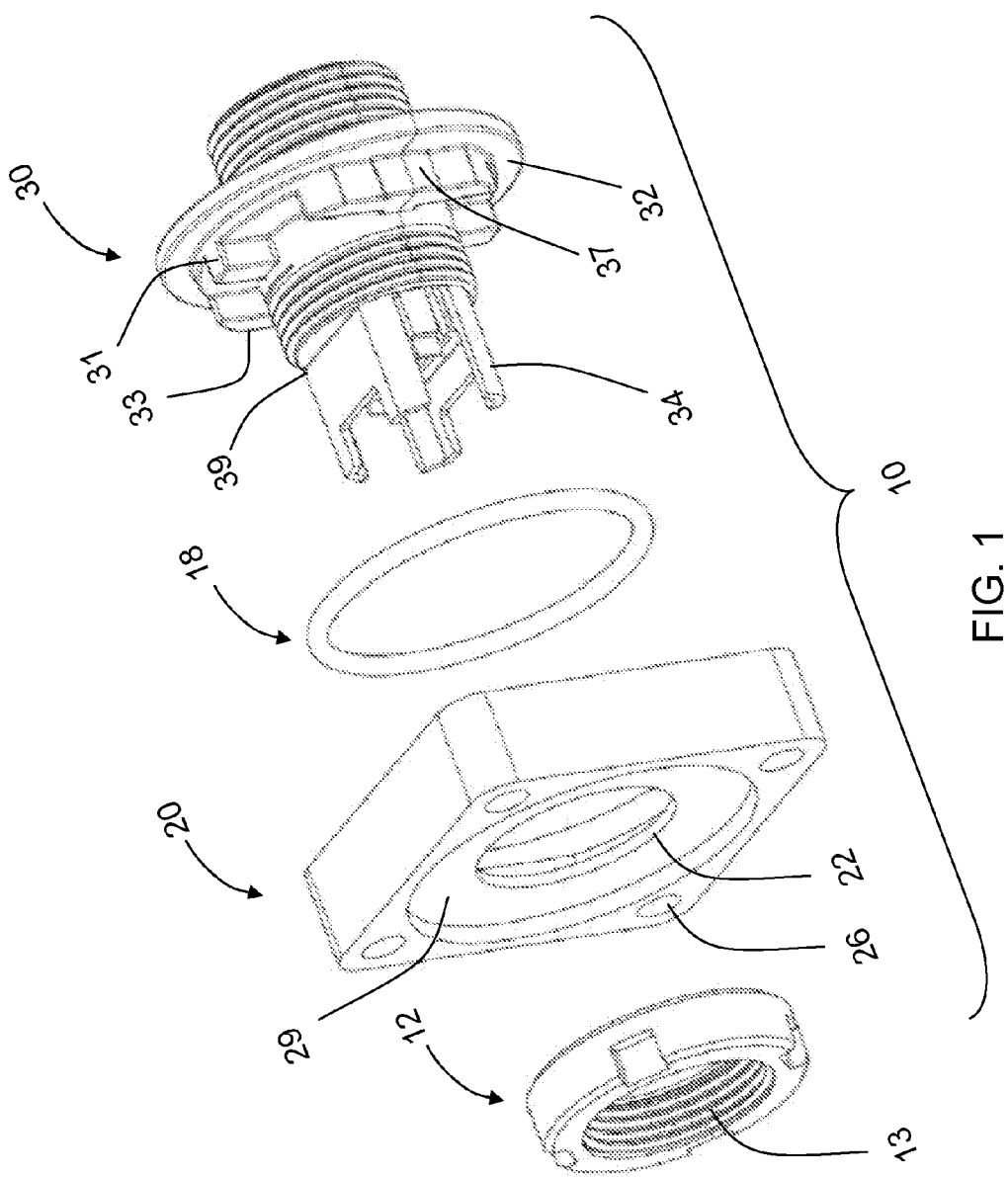
FIG. 1 is an exploded perspective view of an adapter plate assembly.

Reference is now made in detail to embodiments of the disclosure, examples of which are illustrated in the accompanying drawings. Whenever possible, identical or similar reference numerals are used throughout the drawings to refer to identical or similar parts. It should be understood that the embodiments disclosed are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to, the embodiments described herein.

An adapter plate is disclosed that may receive, for example, a standard connector adapter, for mounting the standard connector adapter to a structure, for example, a wall or a housing. The adapter plate includes a connector adapter footprint for a connector adapter, and also includes a mounting structure for mounting the adapter plate to a wall, eliminating the need to have the footprint located in the wall or housing. By having the footprint located in the adapter plate, in-the-field conversions from, for example, one type of connector adapter to another type of connector adapter are possible without replacing, for example, a proprietary housing or module. The disclosure includes an exemplary connector adapter and an adapter plate having a corresponding exemplary adapter footprint; however, adapter plate embodiments having other footprints that may receive other connector adapters are possible. The disclosure also includes methods for assembling the adapter plate to the connector adapter and fitting the adapter plate to a wall or housing, as well as methods for altering a wall or a housing to receive the adapter plate.

Various embodiments will be further clarified by the following examples.

An adapter plate assembly 10 includes a coupling nut 12, an adapter plate 20, an adapter gasket 14, and an adapter 30 (FIG. 1). Coupling nut 12 may have a threaded interior 13. Adapter gasket 14 may include a sealing member or surface, for example, a gasket or an O-ring, and may be made from a resilient material, for example, a silicone or a rubber material. An exemplary adapter plate 20 (FIGS. 1-4) may include a footprint receiving portion, the footprint receiving portion including, for example, at least one curved side 21, at least one flat side 23, and at least one key slot 28. The footprint receiving portion is adjacent to at least one footprint seat 27. Adapter plate 20 further includes at least one through aperture 22, at least one flange cutout 24, at least one sealing surface 25, at least one bolt aperture 26, and at least one adapter mating seat 29. An attachment feature may include bolt aperture 26 in some embodiments. In other embodiments, the attachment feature may include adhesives, clips, or thumbscrews. Footprint seat 27 and adapter mating seat 29 are substantially aligned, for example, parallel to each other, and are located on opposite sides of adapter plate 20. Flange cutout 24 may be located adjacent to sealing surface 25. Adapter plate 20 may be made from a metal alloy, for example, stainless steel or aluminum; however, in alternate embodiments adapter plate 20 may be made from a thermoplastic material, a thermoset material, or other suitable materials or combinations of materials.

Adapter 30 (FIG. 1) includes a footprint adjacent to a flange 32. The footprint may include at least one curved side 31, at least one straight side 33, and at least one orientation key 37. Adapter 30 also includes at least one shroud portion 34, a first end 38 and a second end 39. Flange 32 may provide support against a portion of adapter plate 20, or, for example a wall or housing, in which adapter 30 may be installed. In an exemplary embodiment, adapter 30 is used to align two dissimilar connectors for mating. First end 38 of adapter 30 may receive such a connector as a hardened multi-fiber optical connector known under the mark OptiTip®, available from Corning Cable Systems LLC of Hickory, N.C., that may endure such harsh environmental conditions as heat, cold, humidity, or ultraviolet light exposure. A second end 39 of the adapter 30 may receive, for example, an unsealed connector, for example, an MT connector, that may be used in such areas as climate controlled telecommunication rooms or, for example, environmentally sealed electronics or optical housings. First end 38 may have external threads for threadable engagement with, for example, a coupling nut of the ruggedized connector. Second end 39 may have external threads for threadably engaging interior 13 on coupling nut 12; however, such engaging structures are exemplary and other coupling arrangements are possible. Adapter 30 may be integrally formed or may include one or more joined together components. Adapter 30 may be made from such thermoplastic materials as nylon or ULTEM™ material provided by Saudi Basic Industries Corporation (SABIC) Innovative Plastics, Houston, Tex., or may be made from metal, ceramic, or other suitable material or combinations of materials.

Adapter 30 functions to reduce or eliminate forces placed upon the ferrule during loading and removal. Shroud portions 34 of the adapter have a length to accept and partially surround a portion of a connector housing, for example, an MT connector housing, that is handled during loading and unloading. Clearances between the connector housing and the adapter 30 are reduced to substantially eliminate any large clearances between components and prevent forces from reaching the ferrule. In other words, excess clearance is eliminated, protecting the connector from side-loading forces. In other embodiments, adapter 30 may include variations of wrap-around arms that engage with the sides of the connector housing. Shroud protrusions may also include a full cup-shaped protrusion, a partial-surround, castling, or any other structure that provides lengthened engagement to the MT connector housing. This insures that the MT connector is aligned accurately along the long fiber axis and serves to bolster the rigidity of the MT connector in the short axis during disengagement.

Adapter 30 can be a standard adapter or any kind of adapter with a standard outer profile. For purposes of this disclosure, "standard" is characterized by a mating format that requires a particular set of criteria for attaching or mating an adapter to a surface. For example, adapter 30, having a footprint of curved side 31, straight side 33, and orientation key 37, all arranged in a particular fashion for a particular function, may not perform optimally if not mated to a surface having a correspondingly arranged receptacle. Adapter plate 20 includes, in exemplary embodiments, the appropriate features to receive, in this example, adapter 30 in such a manner as to retain the performance, retention, strength, sealing, and all other benefits designed into adapter 30. In turn, by attaching adapter plate 20 to a generic, or non-standard, surface, for example, a wall or housing, adapter plate 20 transfers the "standard" for adapter 30 to the non-standard surface. In other embodiments, adapter plate 20 may receive, for example, Hardened Fiber Optic Adapters (HFOAs) that comply with Telcordia GR-3120, Issue 2, April 2010, *Generic Requirements for Hardened Fiber Optic Connectors*, for mating with GR-3120 compliant Hardened Fiber Optic Connectors (HFOCs). In yet other embodiments, adapter plate 20 may receive non-hardened adapters suitable for receiving and mating such non-hardened connectors as, but not limited to, SC, ST, LC, DC, MTP®, MPO, MT-RJ and SC-DC® connectors.

Adapter plate assembly 10 may be assembled by axially inserting adapter 30 into adapter plate 20 (FIGS. 5 and 6). Adapter gasket 14 may be applied about footprint 31 and may contact flange 32. Second end 39 is inserted through primary aperture 22 until gasket 14 contacts sealing surface 25. Orientation key 37 is associated with key slot 28 and side 33 is associated with flat 23. A bottom portion 31a of footprint 31, located opposite flange 32, serves as a stop against footprint seat 27 to avoid damaging flange 32. Coupling nut 12 is threadably engaged with the external threading on second end 39 and tightened against mating seat 29, drawing bottom portion 31a into sealable contact with sealing surface 25.

Adapter plate assembly 10 may be attached to, for example, a wall 40 (FIG. 6). In exemplary embodiments, one side of wall 40 is a sealed side 42 and the other side of wall 40 is an unsealed side 44. A plate gasket 19 may be fitted against mating seat 29 for sealing the unsealed side 44, having the attached plate assembly 10, from the sealed side 42. Plate assembly 10 is placed against wall 40, inserting shroud portion 34, coupling nut 12 and second end 39 through a wall aperture 43. Bolts 46 may be inserted through bolt apertures 26 and through a wall bolt aperture, which may be a tapped hole or a through hole. A nut 45 may be secured to bolt 46 and tightened. In an exemplary embodiment, adapter plate 20 has four bolt apertures 26 and may receive four bolts 46. However, other embodiments may have one, two, three, or more than four bolt apertures and receive a corresponding number of bolts.

In the event that wall 40 is a non-standard wall, a drill template 50 (FIG. 7) may be attached to wall 40 to provide guidance for drilling openings to receive plate assembly 10. For purposes of this disclosure, a non-standard wall or housing is a wall or housing that may not receive a standard adapter. The non-standard wall may not have appropriate footprint receiving portion or apertures suitable to receive a standard adapter. Drill template may include at least one aperture outline 52, at least one aperture center 53, at least one bolt aperture outline 54 and at least one bolt aperture center 55. Drill template 50 may placed at an appropriate location on, for example, wall 40 or some other structure. Drill template 50 may be an adhesive label or sticker, or may be a plastic or paper sheet with no adhesive that may be secured using glue or adhesive tape. Once in place, drill template 50 may act as a guide to drill a series of holes to the corresponding hole sizes in the corresponding hole locations required for plate assembly 10.

Figure 8:
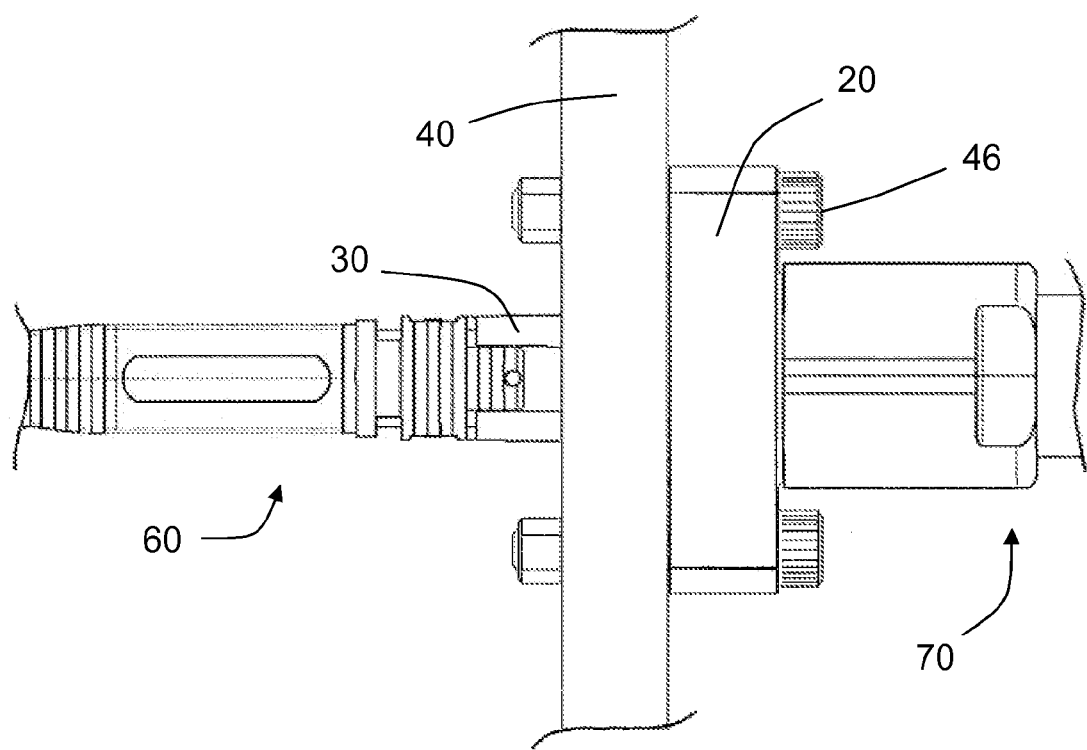
FIG. 8 is a side view of the adapter plate assembly mounted on a wall, populated by connectors.

A hardened connector 70 may be mated to an MT connector 60 through wall 40 (FIG. 8) by using adapter plate 20. Wall 40 may be otherwise unable to receive adapter 30, for example, may not have the necessary footprint, may be too thick, or may not have apertures at all. Adapter plate 20 and alternative adapter plates for other adapters provide a feature to secure standard connector adapters to non-standard walls, housings, and sheet metal that may not have been previously prepared to receive standard adapters.

Adapter plate assembly 10 may be installed in harsh environments, for example, on outdoor housings, aerial housings, or antenna mounted electronics housings for Fiber to the Antenna applications, as in a remote radio head. Adapter plate assembly 10 may be used for retrofitting the antenna mounted electronics housing to improve, for example, bandwidth, channel capacity, or scalability, replacing single or double fiber connectors with multi-fiber connectors.

Unless otherwise expressly stated, it is in no way intended that any method set out herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosed adapter plate and adapter plate assembly. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An adapter plate assembly, comprising:
    an adapter for mating two connectors, the adapter including a first end and a second end and a passage therethrough, the first end having an external threaded portion and the second end having an external threaded portion, the first end adapted to receive a ruggedized connector and the second end adapted to receive an MT connector, the adapter further including an adapter footprint and an adapter flange; and
    an adapter plate, the adapter plate including an aperture for receiving at least a portion of the adapter therethrough, a footprint receiving portion for receiving at least a portion of the adapter footprint, a flange receiving portion for receiving the adapter flange, the adapter plate further including an attachment feature.

2. The assembly of claim 1, the footprint receiving portion including at least one curved side, at least one flat side, and at least one key slot.

3. The assembly of claim 1, the adapter including at least one side-loading force reducing structure.

4. The assembly of claim 1, the adapter plate assembly being secured to a wall.

5. The assembly of claim 4, the wall being part of an electronics equipment housing.

6. The assembly of claim 4, the wall being part of a remote radio head.

7. The assembly of claim 1, the first end of the adapter threadably engaging with a coupling nut of the ruggedized connector.

8. An adapter plate for attaching a standard adapter to a non-standard wall, the adapter plate comprising:
    a front and a back and an aperture therethrough for receiving at least a portion of a standard adapter;
    a footprint receiving portion for receiving at least a portion of an adapter footprint;
    a flange receiving portion for receiving an adapter flange; and
    an attachment feature for attaching the adapter plate to a non-standard wall.

9. The assembly of claim 8, the footprint receiving portion including at least one curved side, at least one flat side, and at least one key slot.

* * * * *